United States Patent
Sun et al.

(10) Patent No.: US 12,511,826 B2
(45) Date of Patent: Dec. 30, 2025

(54) POINT CLOUD MODEL PROCESSING METHOD AND APPARATUS, AND READABLE STORAGE MEDIUM

(71) Applicant: Beijing Zitiao Network Technology Co., Ltd., Beijing (CN)

(72) Inventors: Xi Sun, Beijing (CN); Zhenbo Song, Beijing (CN); Yongjie Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 180 days.

(21) Appl. No.: 18/283,705

(22) PCT Filed: Mar. 30, 2022

(86) PCT No.: PCT/CN2022/084109
§ 371 (c)(1),
(2) Date: Sep. 22, 2023

(87) PCT Pub. No.: WO2022/237368
PCT Pub. Date: Nov. 17, 2022

(65) Prior Publication Data
US 2024/0161392 A1 May 16, 2024

(30) Foreign Application Priority Data
May 13, 2021 (CN) .......................... 202110524280.6

(51) Int. Cl.
*G06T 7/00* (2017.01)
*G06T 7/73* (2017.01)
(Continued)

(52) U.S. Cl.
CPC ............... *G06T 17/00* (2013.01); *G06T 7/74* (2017.01); *G06T 19/20* (2013.01);
(Continued)

(58) Field of Classification Search
None
See application file for complete search history.

(56) References Cited

U.S. PATENT DOCUMENTS 9,443,134 B2 * 9/2016 Gupta .................... G06F 18/21
10,650,590 B1 * 5/2020 Topiwala ................ H04L 67/61
(Continued)

FOREIGN PATENT DOCUMENTS

CN 108921939 A 11/2018

OTHER PUBLICATIONS

International Search Report in PCT/CN2022/084109, mailed Jun. 8, 2022, 4 pages.
(Continued)

*Primary Examiner* — Martin Mushambo
(74) *Attorney, Agent, or Firm* — Astute IP Law Group (57) ABSTRACT

Disclosed are a point cloud model processing method and apparatus, and a readable storage medium. The method includes: acquiring a target image pair and first and second neighborhood images corresponding to the target image pair from first and second image sets photographed for a target scene with different visual effects; performing a calculation to obtain a merge parameter based on the relationship among the target image pair, the first neighborhood image, the second neighborhood image, a first point cloud model, and a second point cloud model; and merging the first point cloud model and the second point cloud model based on the merge parameter to obtain a target point cloud model for reconstructing a three-dimensional structure of the target scene.

20 Claims, 5 Drawing Sheets

(51) Int. Cl.
*G06T 17/00* (2006.01)
*G06T 19/20* (2011.01)

(52) U.S. Cl.
CPC .............. *G06T 2207/20081* (2013.01); *G06T 2207/20221* (2013.01); *G06T 2207/30244* (2013.01); *G06T 2210/56* (2013.01); *G06T 2219/2004* (2013.01)

(56) References Cited

U.S. PATENT DOCUMENTS

| | | | | |
|---|---|---|---|---|
| 10,699,458 | B2* | 6/2020 | Ranzinger | G06T 11/60 |
| 10,762,126 | B2* | 9/2020 | Moussaffi | H04N 1/00196 |
| 10,848,731 | B2* | 11/2020 | Simek | H04N 13/106 |
| 10,970,425 | B2* | 4/2021 | Yang | H04N 13/332 |
| 11,074,701 | B2* | 7/2021 | Hoiem | G06T 11/203 |
| 11,080,286 | B2* | 8/2021 | Akman | G06T 17/20 |
| 11,094,137 | B2* | 8/2021 | Gausebeck | G06T 19/20 |
| 11,170,552 | B2* | 11/2021 | Zhang | G06T 13/40 |
| 11,232,633 | B2* | 1/2022 | Lee | G06T 19/20 |
| 11,335,063 | B2* | 5/2022 | Lee | G06T 17/20 |
| 11,443,469 | B2* | 9/2022 | Moussaffi | G06T 11/60 |
| 11,741,631 | B2* | 8/2023 | Serackis | G06T 7/251 |
| | | | | 382/100 |
| 11,941,827 | B2* | 3/2024 | D'Ercoli | G06T 7/38 |
| 11,954,795 | B2* | 4/2024 | Pavlidis | G06V 20/176 |
| 12,026,834 | B2* | 7/2024 | Bhatia | G06V 20/653 |
| 12,062,245 | B2* | 8/2024 | Serackis | G06N 3/09 |
| 2008/0310757 | A1* | 12/2008 | Wolberg | G06V 20/653 |
| | | | | 382/285 |
| 2014/0218353 | A1* | 8/2014 | Solem | G06T 15/005 |
| | | | | 345/419 |
| 2017/0018113 | A1* | 1/2017 | Lattanzi | G06T 15/205 |
| 2018/0094917 | A1* | 4/2018 | Zhao | H04N 23/56 |
| 2018/0276885 | A1* | 9/2018 | Singh | G06T 7/579 |
| 2018/0308254 | A1* | 10/2018 | Fu | G06V 20/64 |
| 2019/0117075 | A1* | 4/2019 | Fan | A61B 5/0073 |
| 2019/0364206 | A1* | 11/2019 | Dal Mutto | G06T 7/73 |
| 2020/0129069 | A1* | 4/2020 | Inglese | A61B 5/0088 |
| 2020/0273138 | A1* | 8/2020 | Chavez | G06T 7/73 |
| 2021/0349217 | A1* | 11/2021 | Jin | G01S 17/89 |
| 2022/0215616 | A1* | 7/2022 | Huang | G06T 15/08 |

OTHER PUBLICATIONS

Toldo et al., "Hierarchical structure-and-motion recovery from uncalibrated images," Computer Vision and Image Understanding, Jun. 2015, vol. 140, 17 pages.

Wu et al., "3D Reconstruction of Scene Based on Monocular Multi-View Image," Optics & Optoelectronic Technology, Oct. 2020, vol. 18, No. 5, 6 pages, with English Abstract.

* cited by examiner

POINT CLOUD MODEL PROCESSING METHOD AND APPARATUS, AND READABLE STORAGE MEDIUM

CROSS REFERENCE TO RELATED APPLICATIONS

This is a national stage application filed under 35 U.S.C. 371 of International Patent Application No. PCT/CN2022/084109, filed Mar. 30, 2022, which claims the priority to Chinese patent application No. 202110524280.6, entitled "POINT CLOUD MODEL PROCESSING METHOD AND APPARATUS, AND READABLE STORAGE MEDIUM" and filed on May 13, 2021, the disclosures of which are incorporated herein by reference in their entireties.

TECHNICAL FIELD

The present disclosure relates to the field of image processing, and more particularly, to a point cloud model processing method and apparatus, and a readable storage medium.

BACKGROUND

Image-based three-dimensional reconstruction has been widely applied in various fields such as land surveying, virtual reality, movie entertainment, and high-precision maps because image data can be acquired quickly and cheaply. In three-dimensional reconstruction, a plurality of three-dimensional point cloud models are obtained by taking a multi-frame image or a video sequence of an object to perform three-dimensional reconstruction, and then the plurality of reconstructed three-dimensional point cloud models are merged, and a three-dimensional structure of the object is reproduced from a three-dimensional point cloud model after merging.

In the prior art, based on the plurality of reconstructed three-dimensional point cloud models, an iterative closest point (ICP) algorithm is typically employed to obtain a merge parameter, and the plurality of three-dimensional point cloud models are merged based on the merge parameter. In the above method, coordinate alignment is based directly on point clouds, and thus the accuracy of the resultant point cloud model after merging is low.

SUMMARY

To solve the above technical problem or at least partially solve the above technical problem, the present disclosure provides a point cloud model processing method and apparatus, and a readable storage medium.

In a first aspect, an embodiment of the present disclosure provides a point cloud model processing method, including:
acquiring, based on first and second image sets photographed for a target scene, a target image pair and at least one first and second neighborhood images corresponding to the target image pair, wherein the first image set includes a plurality of first images having a first visual effect, the second image set includes a plurality of second images having a second visual effect, the target image pair includes a first target image and a second target image having a similarity satisfying a first criterion, the at least one first neighborhood image includes an image in the first image set having a similarity with the first target image satisfying a second criterion, the at least one second neighborhood image includes an image in the second image set having a similarity with the second target image satisfying a third criterion;
acquiring a merge parameter based on a relationship among the target image pair, the at least one first neighborhood image, the at least one second neighborhood image, a first point cloud model, and a second point cloud model, wherein the first point cloud model includes a three-dimensional point cloud model reconstructed in advance based on the first image set, the second point cloud model includes a three-dimensional point cloud model reconstructed in advance based on the second image set; and
merging the first point cloud model and the second point cloud model based on the merge parameter to acquire a target point cloud model.

In some possible implementations, said acquiring, based on the first and second image sets photographed for the target scene, the target image pair and the at least one first and second neighborhood image corresponding to the target image pair includes:
inputting the first and second image sets into a pre-trained image retrieval model, and acquiring the target image pair output by the image retrieval model and the at least one first and second neighborhood images corresponding to the target image pair.

In some possible implementations, said acquiring the merge parameter based on the relationship among the target image pair, the at least one first neighborhood image, the at least one second neighborhood image, the first point cloud model, and the second point cloud model includes:
performing feature triangulation based on a second matching relationship and a camera position corresponding to the at least one first neighborhood image to acquire a third point cloud model, wherein the second matching relationship includes a pixel matching relationship between the first target image and the at least one first neighborhood image, and the third point cloud model and the first point cloud model are presented in a same coordinate system on a same scale;
performing feature triangulation based on a third matching relationship and a camera position corresponding to the at least one second neighborhood image to acquire a fourth point cloud model, wherein the third matching relationship includes a pixel matching relationship between the second target image and the at least one second neighborhood image, and the fourth point cloud model and the second point cloud model are presented in a same coordinate system on a same scale; and
acquiring the merge parameter based on a fourth matching relationship between a point cloud in the third point cloud model and a point cloud in the fourth point cloud model.

In some possible implementations, the second matching relationship and the third matching relationship are both obtained based on a first matching relationship, wherein the first matching relationship is a pixel matching relationship between the first target image and the second target image in the target image pair.

In some possible implementations, said acquiring the merge parameter based on the point cloud matching relationship between the point cloud in the third point cloud model and the point cloud in the fourth point cloud model includes:
acquiring the fourth matching relationship based on the first matching relationship, the second matching relationship, the third matching relationship, a fifth matching relationship, and a sixth matching relationship, wherein the fifth matching relationship is a matching relationship between a pixel in the at least one first neighborhood image and the point cloud in the third point cloud model, and the sixth matching relationship is a matching relationship between a pixel in the at least one second neighborhood image and the point cloud in the fourth point cloud model; and acquiring the merge parameter based on positions of the point clouds involved in the fourth matching relationship in respective coordinate systems.

In some possible implementations, said acquiring the merge parameter based on the fourth matching relationship between the point cloud in the third point cloud model and the point cloud in the fourth point cloud model includes:

acquiring, based on the fourth matching relationship and the positions of the point clouds involved in the fourth matching relationship in respective coordinate systems, the merge parameter by employing an iterative closest point algorithm based on random sample consensus.

In some possible implementations, the method further includes: after said merging the first point cloud model and the second point cloud model based on the merge parameter to acquire the target point cloud model, merging the fourth matching relationship into the target point cloud model.

In some possible implementations, said acquiring the merge parameter based on the relationship among the target image pair, the at least one first neighborhood image, the at least one second neighborhood image, the first point cloud model, and the second point cloud model includes:

acquiring target pixels in the target image pair, the at least one first neighborhood image, and the at least one second neighborhood image respectively that are corresponding to a pre-labeled feature point in the target scene, and point clouds in the first point cloud model and the second point cloud model respectively that are corresponding to the pre-labeled feature point; and acquiring the merge parameter based on the target pixels and the target point clouds corresponding to the feature points.

In some possible implementations, said acquiring the merge parameter based on the target pixels and the target point clouds corresponding to the feature points includes:

acquiring, based on a position of each of the target pixels in the image to which the target pixel belongs and a position of each of the target point clouds in the point cloud model to which the target point cloud belongs, the merge parameter by employing a PnP algorithm based on random sample consensus.

In some possible implementations, the method further includes: after said merging the first point cloud model and the second point cloud model based on the merge parameter to acquire the target point cloud model, merging a correspondence relationship among the feature points, the target pixels and the target point clouds into the target point cloud model.

In some possible implementations, the method further includes:

merging camera positions of the first images in the first image set and camera positions of the second images in the second image set into the target point cloud model based on the merge parameter.

In some possible implementations, the method further includes:

performing maximum likelihood estimation on the camera positions of the first images, new camera positions of the second images, and positions of the point clouds in the target point cloud model based on a bundle adjustment optimization algorithm to obtain an estimation result; and adjusting the camera positions of the first images, the camera positions of the second images, and the positions of the point clouds in the target point cloud model based on the estimation result.

In some possible implementations, the method further includes:

reconstructing a three-dimensional structure of the target scene based on the target point cloud model.

In a second aspect, an embodiment of the present disclosure provides a point cloud model processing apparatus, including:

an image extracting module configured to acquire a target image pair and at least one first and second neighborhood images corresponding to the target image pair based on first and second image sets photographed for a target scene, wherein the first image set includes a plurality of first images having a first visual effect, the second image set includes a plurality of second images having a second visual effect, the target image pair includes a first target image and a second target image having a similarity satisfying a first criterion, the at least one first neighborhood image includes an image in the first image set having a similarity with the first target image satisfying a second criterion, the at least one second neighborhood image includes an image in the second image set having a similarity with the second target image satisfying a third criterion;

a parameter calculating module configured to acquire a merge parameter based on a relationship among the target image pair, the at least one first neighborhood image, the at least one second neighborhood image, a first point cloud model, and a second point cloud model, wherein the first point cloud model is a three-dimensional point cloud model reconstructed in advance based on the first image set, the second point cloud model is a three-dimensional point cloud model reconstructed in advance based on the second image set; and a merging module configured to merge the first point cloud model and the second point cloud model based on the merge parameter to acquire a target point cloud model.

In a third aspect, an embodiment of the present disclosure provides an electronic device, including a memory, a processor, and a computer program instruction.

The memory is configured to store the computer program instruction.

The processor is configured to execute the computer program instruction, and the processor, when executing the computer program instruction, implements the point cloud model processing method according to any embodiment of the first aspect.

In a fourth aspect, an embodiment of the present disclosure provides a readable storage medium, including a program.

When the program is executed by at least one processor of an electronic device, the electronic device implements the point cloud model processing method according to any embodiment of the first aspect.

In a fifth aspect, an embodiment of the present disclosure provides a program product, including a computer program. The computer program is stored in a readable storage medium, from which at least one processor of the electronic device can read the computer program, and the computer program is executable by the at least one processor to cause the electronic device to implement the method according to any embodiment of the first aspect.

The embodiments of the present disclosure provide a point cloud model processing method and apparatus, and a readable storage medium. At least one target image pair and first and second neighborhood images corresponding to the target image pair is acquired from first and second image sets photographed for a target scene and having different visual effects, a calculation is performed to obtain a merge parameter for each target image pair based on a relationship among the target image pair, the first and second neighborhood images, the first and second point cloud models, and the first point cloud model and the second point cloud model are merged based on the merge parameter corresponding to each target image pair to obtain a target point cloud model for reconstructing a three-dimensional structure of the target scene. Herein, more original image information is brought into the merging of point cloud models, the consensus of the point cloud model obtained after merging according to the present solution is higher than that obtained by merging directly based on point cloud models in the prior art.

BRIEF DESCRIPTION OF DRAWINGS

The accompanying drawings, incorporated in and constitute a part of this specification, illustrate embodiments in line with the disclosure and, together with the description, serve to explain the principles of the disclosure.

To explain the embodiments of the present disclosure or the technical solutions in the prior art more clearly, a brief description is given below to illustrate the drawings that are needed to be used in the description of the embodiments or the prior art. Apparently, a person skilled in the art may devise other drawings according to these drawings without involving any inventive effort.

DESCRIPTION OF EMBODIMENTS

In order that the above object, features, and advantages of the present disclosure may be more clearly understood, a further description of the solution of the present disclosure is provided below. It is noted that embodiments of the present disclosure and features of the embodiments may be combined with each other without conflict.

In the following description, specific details are set forth to provide a thorough understanding of the present disclosure, but the present disclosure may be practiced otherwise than as specifically described herein. It is to be understood that the embodiments in the specification are only a few embodiments of the present disclosure, not all embodiments of the present disclosure.

The automatic restoration of camera parameters and a three-dimensional structure of a scene from a plurality of images or video sequences is called structure from motion (SMF). The SMF algorithm is widely applied in the reconstruction of a large scene. However, the SMF algorithm depends largely on the matching of feature points between images, and the reliability of matching of image feature points is lower if the visual effects of the images are different when the images are collected in different periods, different seasons, different light conditions, etc. Therefore, it is proposed herein that, firstly, the collected images are classified, and secondly, three-dimensional point cloud models are reconstructed from the classified images, and then the plurality of three-dimensional point cloud models are merged.

An ICP algorithm is employed to obtain a merge parameter of two three-dimensional point cloud models, and then the alignment between the two three-dimensional point cloud models is obtained. This manner requires that the point clouds shall be distributed in a relatively uniform way and, in the case of a model of sparse point clouds, the merging effect is undesirable.

In some cases, there is also a way to perform a rough alignment according to a collecting trajectory based on the camera positions when generating the point cloud model and employ the ICP algorithm to obtain the merge parameters and perform the alignment. However, the rough alignment according to the collecting trajectory requires the collecting view angles to be relatively consistent, which is limited in application scenarios.

In view of the above problem, the embodiments of the present disclosure provide a point cloud model processing method. In this method, a target image pair is selected from an image set containing different visual effects, and a spatial matching relationship between two point cloud models before merging is established on the basis of an image feature matching relationship (a 2D-2D matching relationship) between a first target image and a second target image in the target image pair and an image feature matching relationship (a 2D-2D matching relationship) between the target image pair and another similar image, a calculation is performed to obtain a merging parameter. Compared with calculating the merge parameter and merging directly according to the two point cloud models, the solution herein brings more original image information to the merging and alignment, and obtains a more accurate merge parameter, and the consensus of the point cloud model after merging is higher.

Figure 1:
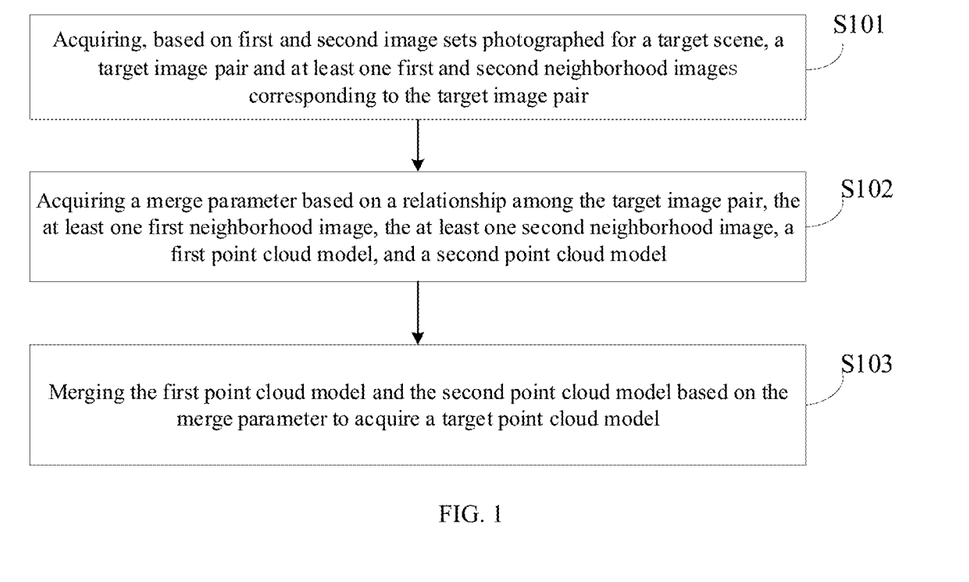
FIG. 1 is a flowchart of a point cloud model processing method according to an embodiment of the present disclosure.

FIG. 1 is a flowchart of a point cloud model processing method according to an embodiment of the present disclosure. As shown in FIG. 1, the method of the present embodiment includes the steps below.

In step S101, a target image pair and at least one first and second neighborhood images corresponding to the target image pair are acquired based on first and second image sets photographed for a target scene.

The first image set includes a plurality of first images photographed for a target scene with a first visual effect, and the second image set includes a plurality of second images photographed for the target scene with a second visual effect. Herein, the first visual effect and the second visual effect are different, and the difference between the first visual effect and the second visual effect may be caused by one or more factors such as timing, light, season, and weather.

Illustratively, the first image set includes a set of images taken in sunny weather for the target scene, and the second image set includes a set of images taken in rainy weather for the target scene. Alternatively, the first image set includes a set of images taken in summer for the target scene, and the second image set includes a set of images taken in winter for the target scene. Alternatively, the first image set includes a set of images taken in the daytime for the target scene, and the second image set includes a set of images taken at night for the target scene. The present disclosure is not limited to particular visual effects.

In this solution, there may be one or more target image pairs.

In particular, each target image pair includes a first target image and a second target image having a similarity satisfying a first criterion, the first image set includes the first target image and the second image set includes the second target image. The first neighborhood image corresponding to the target image pair includes an image in the first image set having a similarity with the first target image satisfying a second criterion. The second neighborhood image corresponding to the target image pair includes an image in the second image set having a similarity with the second target image satisfying a third criterion.

Herein, the first criterion, the second criterion and the third criterion may be respectively numerically represented as a first threshold, a second threshold, and a third threshold. The numerical values of the first threshold, the second threshold and the third threshold may be the same or different. In practical applications, the numerical values of the first threshold, the second threshold, and the third threshold may be set according to practical requirements, and the embodiments of the present disclosure are not limited thereto. Alternatively, the first criterion may include: a pre-set number of target image pairs that rank higher among target image pairs that are sorted and determined according to the similarity between the first image and the second image in an order from high to low. The second criterion and the third criterion are implemented similarly to the first criterion.

Optionally, the similarity between the target image pairs may be determined from both the similarity of image textures and the similarity of image semantics between the respective first image and the respective second image. In practical applications, to determine the target image pair, the coverage rate of the image with respect to the target scene may also be considered, and the image pair with a higher similarity and a higher coverage rate can be selected as the target image pair.

The similarity between the first target image and another first image may be determined based on both an offset between a photographing position of the first target image and a photographing position of the another first image and an overlapping area between the first target image and the another first image. Herein, the overlapping area can be determined based on both a photographing direction and a photographing angle of the first target image and a photographing direction and a photographing angle of the another first image.

Acquiring the target image pair from the first and second image sets can be achieved through any of the following implementations.

One possible implementation includes automatically extracting at least one target image pair from the first and second image sets by using an image retrieval technique involving deep learning. Specifically, it is possible to acquire feature information about each first image based on a pre-trained image retrieval model. The feature information about the first image includes image texture information and image semantic information about the first image. Feature information about each second image is acquired based on a pre-trained image retrieval model, wherein the feature information about the second image includes image texture information and image semantic information about the second image. For each first image, the feature information about the first image is matched with the feature information about each second image, respectively, to obtain a similarity between the first image and each second image, respectively. Each first image is subjected to the above process to obtain a similarity between any first image and any second image. At least one target image pair satisfying the first criterion is obtained based on the similarity and the first criterion.

Another possible implementation includes selecting manually the first target image from the first image set and selecting manually the second target image from the second image set, and labeling the first target image and the second target image as the target image pair. If more than one target image pair is required, it would be enough to label them one by one manually.

Acquiring the first and second neighborhood images corresponding to the target image pair based on the target image pair can be achieved as follows.

First, the photographing position and the photographing direction of the first target image and the photographing positions and the photographing directions of other first images in the first image set can be obtained by using a pre-trained deep learning neural network model.

Then, based on the photographing position of the first target image and each of the photographing positions of the other first images, the offset in photographing position between the first target image and each of the other first images is obtained, respectively. A size of the overlapping area between the first target image and each of the other first images is obtained based on an angle included between the photographing direction of the first target image and each of the photographing direction of the other first images, as well as the photographing angle. The similarity between the first target image and each of the other first images is obtained, respectively, based on the above-mentioned offset in the photographing position between the first target image and each of the other first images and the size of the overlapping area between the first target image and each of the other first images. The first image satisfying the second criterion is determined as the first neighborhood image based on the similarity between the first target image and each of other first images respectively.

Optionally, a pre-set correspondence relationship can be queried based on the offset in the photographing position between the first target image and each first image and the size of the overlapping area between the first target image and each first image, so as to obtain the similarity between the first target image and each first image, respectively. Herein, the pre-set correspondence relationship herein is a correspondence relationship among the offset of the photographing position, the size of the overlapping area, and the similarity.

The implementation of acquiring the second neighborhood image is similar to the implementation of acquiring the first neighborhood image, and reference can be made to the detailed description of acquiring the first neighborhood image, which will not be repeated here for the sake of brevity.

In step S102, a merge parameter is acquired based on the relationship among the target image pair, the first neighborhood image, the second neighborhood image, a first point cloud model, and a second point cloud model.

Optionally, the first point cloud model may be a three-dimensional point cloud model of the target scene reconstructed in advance based on the first images in the first image set by using an SMF algorithm, and the second point cloud model may be a three-dimensional point cloud model of the target scene reconstructed in advance based on the second images in the second image set by using the SMF algorithm. Certainly, other algorithms may be used to reconstruct the above-mentioned first point cloud model and second point cloud model based on the first and second image sets, respectively, which is not limited to the solution herein.

In the solution herein, there may be one or more target image pairs. In a case of one target image pair, a resultant merge parameter can direct the merging of the first point cloud model and the second point cloud model.

In a case of more than one target image pair, the target image pairs can correspond to different areas in the target scene, and then the merging of corresponding areas in the first point cloud model and the second point cloud model can be guided pertinently based on the merge parameters obtained by the target image pairs. It should be noted that in the reconstruction of a three-dimensional scene, the target scene (or a point cloud model before merging) is divided into a plurality of areas, and a merge parameter is obtained through calculations for each area, so that the consensus of the point cloud models after merging is higher.

Illustratively, to reconstruct a three-dimensional structure of a building, the building may be defined to have a front, a back, a first side, and a second side. A target image pair 1 is obtained for the front of the building, a target image pair 2 is obtained for the back of the building, a target image pair 3 is obtained for the first side of the building, and a target image pair 4 is obtained for the second side of the building. Calculations are performed for the target image pairs 1 to 4, respectively, to obtain four merge parameters. The merge parameter corresponding to the target image pair 1 is used for merging the point clouds at the front of the building, the merge parameter corresponding to the target image pair 2 is used for merging the point clouds on the back of the building, the merge parameter corresponding to the target image pair 3 is used for merging the point clouds on the first side of the building, and the merge parameter corresponding to the target image pair 4 is used for merging the point clouds on the second side of the building.

Acquiring the merge parameters corresponding to the target image pairs may be achieved through any of the following implementations.

In one possible implementation, the merge parameter can be acquired automatically, specifically through steps 1 to 3 below.

In step 1, a first matching relationship is acquired through a feature matching method based on deep learning; and a second matching relationship and a third matching relationship are acquired based on the pixels involved in the first matching relationship. Herein, the first matching relationship is a pixel matching relationship between the first target image and the second target image, the second matching relationship is a pixel matching relationship between the first target image and the first neighborhood image, and the third matching relationship is a pixel matching relationship between the second target image and the second neighborhood image.

Herein, the feature matching method based on deep learning includes pre-training a satisfactory image matching model through methods involving deep learning and using the image matching model to obtain the results of pixel matching between images. In one possible implementation, the image matching model firstly conducts learning of a hotspot area of one of the images (for example, image A), and determines the hotspot area based on the response values of different areas, wherein a higher response value indicates a higher probability that the area is a hotspot area, and a lower response value indicates a lower probability that the area is a hotspot area. The image matching model is taken to extract feature information about pixels of the hotspot area, wherein the feature information includes image texture information and image semantic information. Thereafter, the image matching model performs matching in other images based on the image information and texture information about the pixels of the hot spot area of the image A, thereby obtaining a pixel matching relationship between the images.

The following exemplifies the pixel matching relationship between images.

Assuming that $A1, A2, \ldots, An$ are pixels in the first target image, and $B1, B2, \ldots, Bn$ are pixels in the second target image, the first matching relationship includes matching relationships between $A1$ and $B1$, between $A2$ and $B2$, $\ldots$, and between $An$ and $Bn$.

Based on the pixels $A1, A2, \ldots, An$ involved in the first matching relationship, matching are performed in the pixels involved in the first neighborhood image, and a second matching relationship is generated based on the matching result. The second matching relationship includes matching relationships between $A1$ and $C1$, between $A2$ and $C2$, $\ldots$, between $Am$ and $Cm$. Here, $C1, C2, \ldots, Cm$ are pixels in the first neighborhood image.

Based on the pixels $B1, B2, \ldots, Bn$ involved in the first matching relationship, matching is performed in the second neighborhood image, and a third matching relationship is generated based on the matching result. The third matching relationship includes matching relationships between $B1$ and $D1$, between $B2$ and $D2$, $\ldots$, between $Bi$ and $Di$. Here, $D1, D2, \ldots, Di$ are pixels in the second neighborhood image. The n, m, and i are all integers greater than or equal to 1, and m is less than or equal to n, i is less than or equal to n.

It should be understood that the first, second, and third matching relationships described above are matching relationships between two-dimensional (2D) pixels. The number of the second matching relationships and the third matching relationships can both be more than one, the number of the second matching relationships is the same as the number of the first neighborhood images, and the number of the third matching relationships is the same as the number of the second neighborhood images.

In step 2, feature triangulation is performed based on the second matching relationship and the camera position of each first neighborhood image to obtain a third point cloud model; and feature triangulation is performed based on the third matching relationship and the camera position of each second neighborhood image to obtain a fourth point cloud model. Here, the third point cloud model and the first point cloud model are presented in a same coordinate system on a same scale, and the fourth point cloud model and the second point cloud model are presented in a same coordinate system on a same scale.

With reference to the above-mentioned example, it can be seen that in the present solution, the pixels of the first target image involved in the second matching relationship are a subset of the pixels of the first target image involved in the first matching relationship, and therefore the third point cloud model obtained based on the second matching relationship is equivalent to a part of the first point cloud model. Similarly, the pixels of the second target image in the third matching relationship are a subset of the pixels of the second target image in the first matching relationship, and therefore the fourth point cloud model obtained based on the third matching relationship is equivalent to a part of the second point cloud model. Obtaining differentiated merge parameters for the respective local areas in the the respective target scenes can improve the consensus of the models after merging.

In addition, since the third point cloud model and the first point cloud model are presented in a same coordinate system on a same scale, and the fourth point cloud model and the second point cloud model are presented in a same coordinate system on a same scale, the merge parameter obtained based on the third point cloud model and the fourth point cloud model can better direct the merging of the first point cloud model and the second point cloud model.

In step 3, the merge parameter is obtained based on the fourth matching relationship between a point cloud in the third point cloud model and a point cloud in the fourth point cloud model.

Specifically, the fourth matching relationship is obtained based on the first matching relationship, the second matching relationship, the third matching relationship, a fifth matching relationship, and a sixth matching relationship. The fourth matching relationship is a matching relationship between a point cloud in the third point cloud model and a point cloud in the fourth point cloud model, which can be understood as a 3D-3D correspondence relationship. Here, the fifth matching relationship is a matching relationship between a pixel in the first neighborhood image and a point cloud in the third point cloud model, and the sixth matching relationship is a matching relationship between a pixel in the second neighborhood image and a point cloud in the fourth point cloud model. Based on the position of each point cloud involved in the fourth matching relationship in a corresponding coordinate system, an iterative closest point algorithm based on random sample consensus (RANSAC-ICP) is employed to obtain the merge parameter.

Herein, the matching relationship between each first image in the first image set and the first point cloud model is obtained when creating the first point cloud model. The matching relationship between each second image in the second image set and the second point cloud model is obtained when creating the second point cloud model.

Since there may be a mismatch of partial point clouds in the fourth matching relationship between the third point cloud model and the fourth point cloud model, this solution uses the RANSAC-ICP algorithm to remove the mismatch and ensure the correct matching. Here, the point clouds that are mismatched are called outliers, and the point clouds that are correctly matched are called inliers. Specifically, to remove the mismatch with the RANSAC-ICP algorithm, firstly, M pairs (for example, M=4) of matched cloud points are sampled randomly, and based on singular value decomposition (SVD), a merge parameters is obtained through calculation and denoted as [s, r, t], where s represents a scaling, r represents a rotation parameter, and t represents a translation parameter. Thereafter, the number of point cloud pairs complying with the merge parameter in the above-mentioned fourth matching relationship is counted based on the merge parameter [s, r, t] and the number of inliers is recorded. The above steps are repeated for W times, and the merge parameter corresponding to the maximum number of inliers is taken as the final result for output. Here, M is a positive integer greater than or equal to 3, and W is a positive integer greater than or equal to 1.

In another possible implementation, manual means may be used. It should be noted that "manual means" as used herein means that the acquisition of information in some of the steps, rather than all the steps, is performed manually. For example, in the implementation shown below, the matching relationship among the target pixel, the target point cloud, and the feature point in the target scene obtained in the step 1 is obtained through manual labeling.

Illustratively, the implementation may include steps 1 and 2 below.

In step 1, target pixels in the target image pair, the at least one first neighborhood image, and the at least one second neighborhood image respectively that are corresponding to a pre-labeled feature point in the target scene are acquired, and target point clouds in the first point cloud model and the second point cloud model respectively that are corresponding to the feature point are of the target scene are acquired.

Here, the pre-labeled target pixels and the target point cloud may be manually labeled based on the feature points of the target scene. It should be understood that there is a matching relationship among the above-mentioned target pixels, the target point cloud and the feature points in the target scene, and the matching relationship can be understood as a 2D-3D correspondence relationship.

In step 2, the merge parameter is obtained based on the above-mentioned target pixels and target feature points.

In a possible implementation, based on a position of each of the target pixels in the image to which the target pixel belongs and a position of each of the target point clouds in the point cloud model to which the target point cloud belongs, the merge parameter is obtained by employing a PnP algorithm based on random sample consensus (RANSAC-PnP).

Specifically, since the above-mentioned 2D-3D correspondence relationship is manually pre-labeled, there may be some 2D-3D correspondence relationships being mismatches, and therefore, this solution employs RANSAC-PnP to remove mismatches and ensure correct matches. Here, the point clouds (or pixels) that are mismatched are called outliers, and the point clouds (or pixels) that are correctly matched are called inliers. Specifically, to remove the mismatches with the RANSAC-PnP algorithm, firstly, M' (for example, M'=4) pairs of target pixels and target point clouds having a matching relationship are randomly sampled, and based on an EPnP algorithm, a merge parameter is obtained through calculation and denoted as [s, r, t], where s represents a scaling, r represents a rotation parameter, and t represents a translation parameter. Thereafter, based on the merge parameter [s, r, t], the number of target pixels and target point cloud pairs complying with the merge parameter in the above-mentioned 2D-3D correspondence relationship is counted, and the number of inliers is recorded. The above-mentioned steps are repeated for W' times, and the merge parameter corresponding to the maximum number of inliers is taken as the final result for output. Here, W' is a positive integer greater than or equal to 1.

In step S103, based on the merge parameter, the first point cloud model and the second point cloud model are merged to obtain the target point cloud model.

Specifically, for each target image pair, point clouds of corresponding areas in the first point cloud model or the second point cloud model are merged based on the merge parameter corresponding to the target image pair, for example, the merging includes one or more of scaling processing, rotation processing and translation processing.

The embodiments of the present disclosure provide a point cloud model processing method including: acquiring at least one target image pair and first and second neighborhood images corresponding to the target image pair from first and second image sets photographed for a target scene and having different visual effects; performing a calculation to obtain a merge parameter for each target image pair based on a relationship among the target image pair, the first and second neighborhood images, the first and second point cloud models; merging the first point cloud model and the second point cloud model based on the merge parameter corresponding to each target image pair to obtain a target point cloud model for reconstructing a three-dimensional structure of the target scene. Herein, much more original image information is brought into the merging of point cloud models, the consensus of the point cloud models obtained after merging according to the present solution is higher than that obtained by merging directly based on point cloud models in the prior art.

Figure 2:
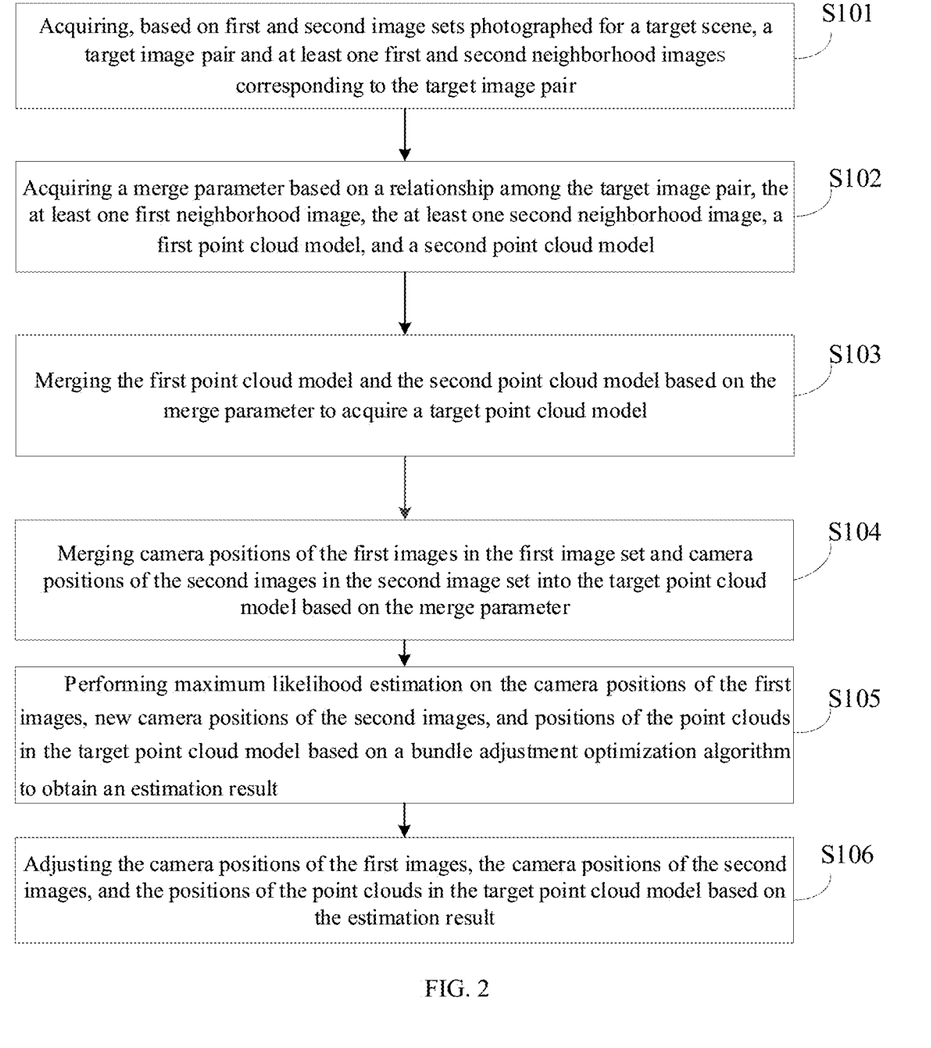
FIG. 2 is a flowchart of a point cloud model processing method according to another embodiment of the present disclosure.

FIG. 2 is a flowchart of a point cloud model processing method provided by another embodiment of the present disclosure. With reference to FIG. 2, after S103, on the basis of the embodiment shown in FIG. 1, the method may further include step S104.

In step S104, based on the merge parameter, the camera positions of the first images in the first image set and the camera positions of the second images in the second image set are merged into a coordinate system of the target point cloud model.

Specifically, firstly, the camera position of each first image in the first image set is added to the coordinate system of the first point cloud model, and the camera position of each second image in the second image set is added to the coordinate system of the second point cloud model. Next, based on the merge parameter of each target image pair, each camera position of the corresponding area in the coordinate system of the first point cloud model is subjected to one or more of the scaling processing, rotation processing, and translation processing. Alternatively, based on the merge parameter of each target image pair, each camera position of the corresponding area in the coordinate system of the second point cloud model is subjected to one or more of scaling processing, rotation processing and translation processing.

This embodiment provides a basis for subsequent other image processing by aligning the photographing position of each image in different image sets into the coordinate system of the target point cloud model by using the merge parameter.

On the basis of the embodiment shown in FIG. 2, the method may optionally further include steps S105 and S106.

In step S105, maximum likelihood estimation is performed on the camera positions of the first images, new camera positions of the second images, and positions of the point clouds in the coordinate system of the target point cloud model based on a bundle adjustment optimization algorithm to obtain an estimation result.

In step S106, the camera positions of the first images, the camera positions of the second images, and the positions of the point clouds in the coordinate system of the target point cloud model are adjusted based on the estimation result.

During the acquisition of the first image set, errors in the camera position accumulate and affect the accuracy of the third point cloud model. Similarly, during the acquisition of the second image set, errors in the camera position accumulate and affect the accuracy of the fourth point cloud model. Therefore, in this embodiment, global optimization is performed by employing the bundle adjustment optimization algorithm, so as to reduce a re-projection error from the three-dimensional point to the two-dimensional image point and render a higher consensus of the target point cloud model after the adjustment.

Optionally, on the basis of the embodiment shown in FIG. 1 or FIG. 2, the method may further include step S107, i.e., reconstructing a three-dimensional structure of the target scene based on the target point cloud model.

It can be understood that the solution here results in a more accurate target point cloud model and thus a more accurate three-dimensional structure of the reconstructed target scene. It is to be noted that this step is not shown in FIG. 1 and FIG. 2.

FIGS. 3A to 3G are a flowchart of a point cloud model processing method provided by another embodiment of the present disclosure. In the embodiment shown in FIGS. 3A to 3G, the first image set includes a set of images taken in the daytime for the target scene, and the second image set includes a set of images taken at night for the target scene, which is taken as an example.

Figure 3A:
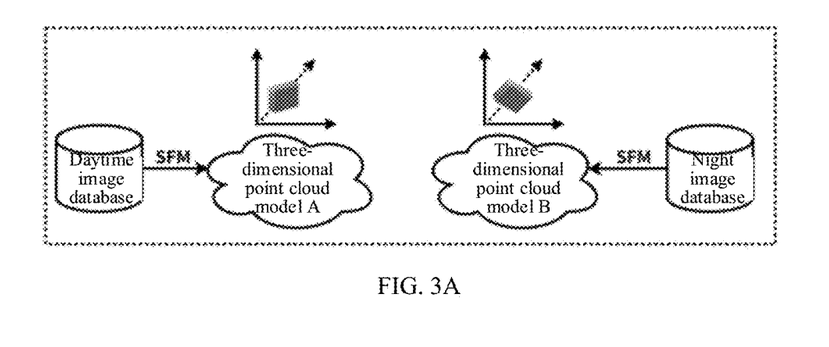
FIGS. 3A to 3G are a flowchart of a point cloud model processing method according to another embodiment of the present disclosure.

With reference to FIG. 3A, a first image set is exemplified by a daytime image database, where the daytime image database includes a plurality of images taken during the daytime for the target scene, and the images in the daytime image database can be referred to as daytime image samples. The second image set is exemplified by a night image database, where the night image database includes a plurality of images taken at night for the target scene, and the images in the night image database can be referred to as night image samples. The point cloud model reconstructed in advance based on the daytime image database is a three-dimensional point cloud model A, and the point cloud model reconstructed in advance based on the night image database is a three-dimensional point cloud model B.

Figure 3B:
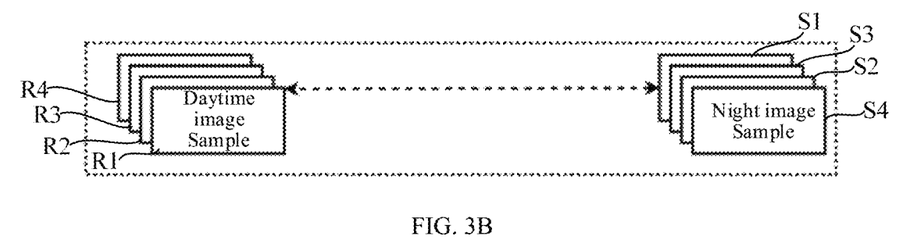

With reference to FIG. 3A and FIG. 3B, the target image pair and the first and second neighborhood images of the target image pair are obtained by performing automatic or manual image retrieval in the daytime image database and the night image database shown in FIG. 3A.

Herein, FIG. 3B shows the case of one target image pair. With reference to FIG. 3B, a daytime image sample R1 and a night image sample S1 are a target image pair, the daytime image samples R2, R3 and R4 are all first neighborhood images of R1, and the night image samples S2, S3 and S4 are all second neighborhood images of S1.

Figure 3C:
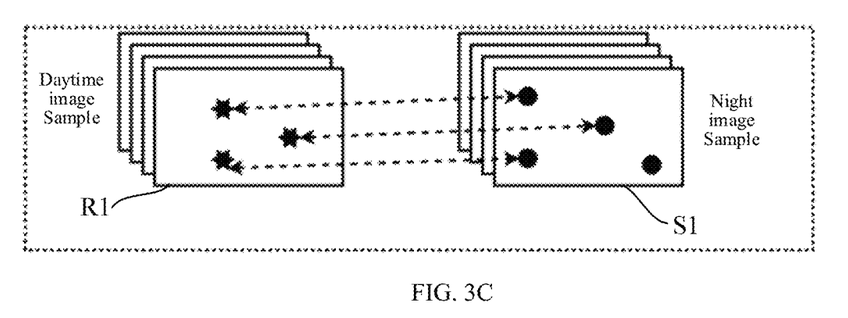

For R1 and S1, the pixel matching relationship between R1 and S1 is obtained by employing a deep learning algorithm or manual labeling method. With reference to FIG. 3C, a solid hexagonal star and a solid circle connected by an arrow at both ends of a dashed line segment, respectively, represent a group of matched pixels, wherein the solid hexagonal star represents pixels having a matching relationship in the daytime image sample R1, and the solid circle represents pixels having a matching relationship in the night image sample S1.

Note that, in the case shown in FIG. 3C, pixels in the daytime image sample R1 and the night image sample S1 that do not have a matching relationship are not shown by labelers.

In the following process, if an automatic means is employed, reference is made to FIG. 3D; if manual means is employed, reference is made to FIG. 3E.

Figure 3D:
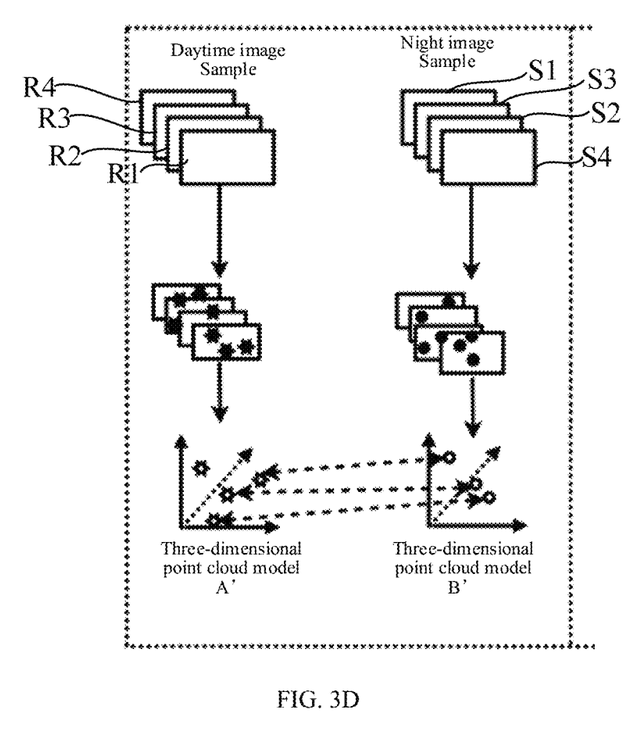

Automatic Means:

With reference to FIG. 3D, firstly, matching is performed in daytime image samples R2, R3 and R4 based on the pixels having a matching relationship in the daytime image sample R1, and matching is performed in the night image samples S2, S3 and S4 based on the pixels having a matching relationship in the night image sample S1. Feature triangulation is performed on the basis of matching results between the daytime image sample R1 and the daytime image samples R2, R3 and R4 respectively, to obtain a three-dimensional point cloud model A'. Feature triangulation is performed on the basis of matching results between the night image sample S1 and the night image samples S2, S3 and S4 respectively, to obtain a three-dimensional point cloud model B'.

Next, the point clouds in the three-dimensional point cloud model A' and the three-dimensional point cloud model B' are correlated by using the matching results between the daytime image sample R1 and the daytime image samples R2, R3, and R4, the matching results between the night image sample S1 and the night image samples S2, S3, and S4, and the matching relationship between the daytime image sample R1 and the night image sample S1, thereby obtaining a 3D-3D correspondence relationship.

With reference to FIG. 3D, a hollow hexagonal star represents a point cloud in the three-dimensional point cloud model A', a hollow circle represents a point cloud in the three-dimensional point cloud model B', and the hollow hexagonal star and the hollow circle connected by an arrow at both ends of a dashed line segment are a group of point clouds having a matching relationship.

Figure 3E:
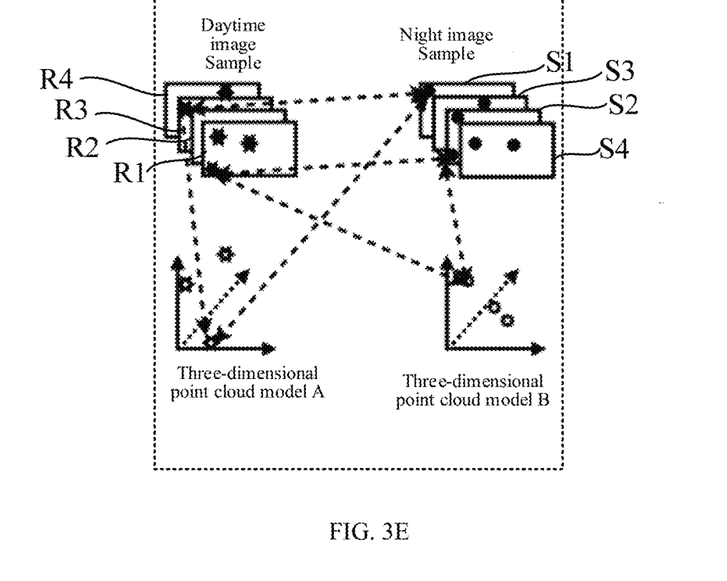

Manual Means:

As shown with reference to FIG. 3E, the feature points in the manually selected daytime image samples R1, R2, R3 and R4 can be correlated to corresponding point clouds in the three-dimensional point cloud model A and/or the three-dimensional point cloud model B. The feature points in the manually selected night image samples S1, S2, S3 and S4 can be correlated to corresponding point clouds in the three-dimensional point cloud model A and/or the three-dimensional point cloud model B, so as to obtain a 2D-3D correspondence relationship.

Herein, generally, the feature point manually selected in the daytime image samples and the feature point manually selected in the night image samples are directed to the same feature point in the target scene. The feature point manually selected in the daytime image samples and the feature point manually selected in the night image samples being directed to the same feature point in the target scene can be determined from the points of which the three-dimensional structure is reconstructed in the three-dimensional point cloud model A or the three-dimensional point cloud model B.

With reference to FIG. 3E, the hollow hexagonal star represents a point cloud in the three-dimensional point cloud model A, and the hollow circle represents a point cloud in the three-dimensional point cloud model B. The hollow hexagonal star and the hollow circle connected by an arrow at both ends of the dashed line segment are a group of point clouds having a matching relationship, the hollow circle and the solid circle connected by an arrow at both ends of the dashed line segment are a group of point cloud and pixel having a matching relationship, and the solid hexagonal star and the solid circle connected by an arrow at both ends of the dashed line segment are a group of pixels having a matching relationship, and the hollow hexagonal star and the solid hexagonal star connected by an arrow at both ends of the dashed line segment are a set of point cloud and pixel having a matching relationship.

FIG. 3E shows the matching relationship between only some pixels and point clouds.

The RANSAC-ICP algorithm is employed to calculate a 3D-3D correspondence relationship obtained in the manner shown in FIG. 3D, or the RANSAC-PnP algorithm is employed to calculate a 2D-3D correspondence relationship obtained in the manner shown in FIG. 3E, so as to obtain the merge parameter between the three-dimensional point cloud model A and the three-dimensional point cloud model B. Herein, the merge parameter is represented as [s, r, t], where s represents a scaling, r represents a rotation parameter, and t represents a translation parameter; the three-dimensional point cloud model A and the three-dimensional point cloud model B are merged based on the merge parameter [s, r, t].

Figure 3F:
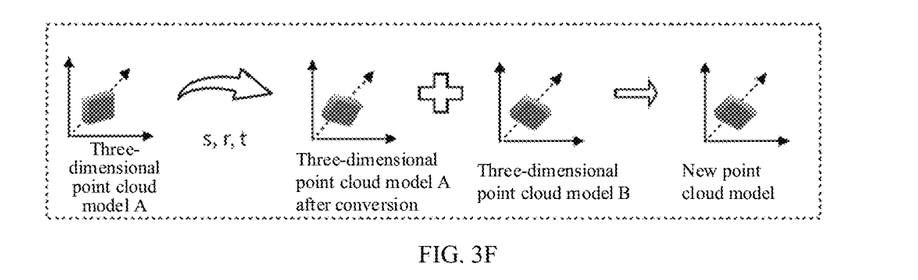

With reference to FIG. 3F, the derived merge parameter [s, r, t] is taken to perform coordinate system conversion on each point cloud of the three-dimensional point cloud model A, and each point cloud of the three-dimensional point cloud model A after conversion is merged with each point cloud of the three-dimensional point cloud model B, so as to align the point cloud model A into the point cloud model B. The point clouds of the three-dimensional point cloud model A and the three-dimensional point cloud model B are merged, and the resultant new point cloud model is the target point cloud model mentioned in the above embodiments.

FIG. 3F shows coordinate system conversion of the three-dimensional point cloud model A. In practical applications, coordinate system conversion may be performed on the three-dimensional point cloud model B based on the merge parameter, and the converted three-dimensional point cloud model B may be merged into the coordinate system of the three-dimensional point cloud model A.

In practical applications, the camera position of each daytime image sample in the daytime image database can also be merged into the coordinate system of the three-dimensional point cloud model B based on the merge parameter, and the camera position of each night image sample in the night image database can be merged into the coordinate system of the three-dimensional point cloud model B.

Figure 3G:
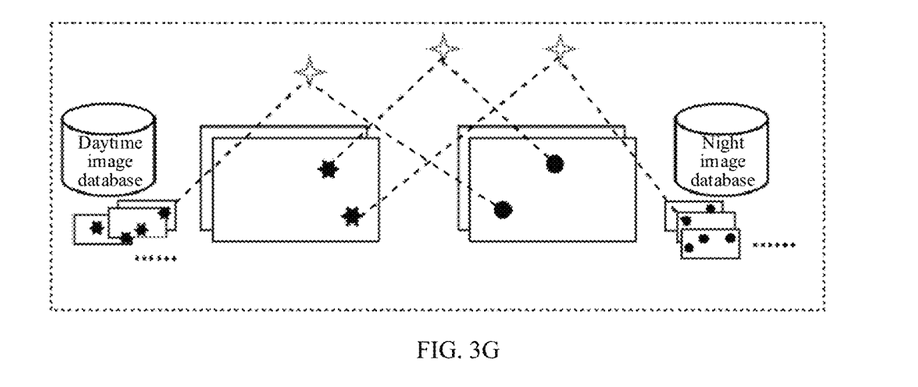

In practical applications, the 3D-3D correspondence or 2D-3D correspondence relationship derived as above can be incorporated into the target point cloud model. With reference to FIG. 3G, a hollow quadrangle star represents a point cloud in the target point cloud model after merging, the hollow quadrangle star and the solid hexagonal star connected by an arrow at both ends of the dashed line segment represent a point cloud and pixel having a matching relationship, and the hollow quadrangle star and the solid circle connected by an arrow at both ends of the dashed line segment represent point a cloud and pixel having a matching relationship. The line segments shown in FIG. 3G represent the above-mentioned 3D-3D or 2D-3D correspondence relationship.

It should be noted that, in order to reduce the re-projection error from the reconstructed three-dimensional point to the two-dimensional image point and improve the consensus of the target point cloud model, the target point cloud model obtained in FIG. 3F can also be globally optimized by employing the bundle adjustment optimization algorithm based on the camera position of each day image sample, the camera position of each night image sample, and the position of each point cloud in the target point cloud model obtained in FIG. 3F.

Figure 4:
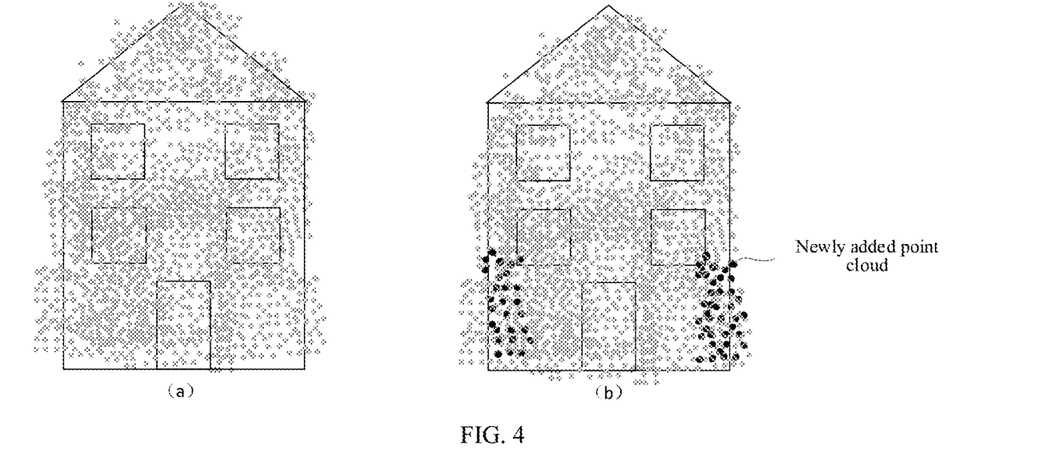
FIG. 4 is a schematic diagram showing the merging effect before global optimization and after global optimization, respectively, by using the point cloud model processing method according to an embodiment of the present disclosure.

Taking a building as an example, FIG. 4 is a schematic diagram showing the merging effect before global optimization and after global optimization, respectively, by using the point cloud model processing method according to an embodiment of the present disclosure. Here, (a) in FIG. 4 is a schematic diagram showing the merging effect without global optimization by using the point cloud model processing method provided by the embodiment of the present disclosure, and (b) in FIG. 4 is a schematic diagram showing the merging effect after global optimization by using the point cloud model processing method provided by the embodiment of the present disclosure. The two cases respectively shown in (a) and (b) in FIG. 4 are compared. With reference to (b) in FIG. 4, a lot of newly added point clouds obtained through the bundle adjustment optimization algorithm are present near both sides of the building, and the position of the point cloud model shown in (b) in FIG. 4 is also fine-tuned according to the estimation result, so that the point cloud model is more accurate. Therefore, it can be seen that the target point cloud model after global optimization by using the bundle adjustment optimization algorithm contains more newly added point clouds, and the position of the optimized point cloud model is also more accurate, so that the resultant point cloud model shows a higher consensus.

Figure 5:
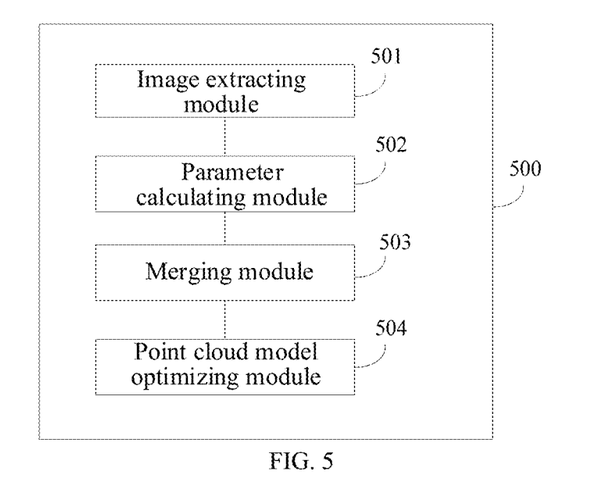
FIG. 5 is a schematic diagram showing a structure of a point cloud model processing apparatus according to an embodiment of the present disclosure.

FIG. 5 is a schematic diagram of a point cloud model processing apparatus according to an embodiment of the present disclosure. With reference to FIG. 5, the point cloud model processing apparatus 500 according to the present embodiment includes an image extracting module 501, a parameter calculating module 502, and a merging module 503.

The image extracting module 501 is configured to acquire, based on first and second image sets photographed for a target scene, a target image pair and at least one first and second neighborhood images corresponding to the target image pair. The first image set includes a plurality of first images having a first visual effect. The second image set includes a plurality of second images having a second visual effect. The target image pair includes a first target image and a second target image having a similarity satisfying a first criterion. The at least one first neighborhood image includes an image in the first image set having a similarity with the first target image satisfying a second criterion. The at least one second neighborhood image includes an image in the second image set having a similarity with the second target image satisfying a third criterion.

The parameter calculating module 502 is configured to acquire a merge parameter based on a relationship among the target image pair, the at least one first neighborhood image, the at least one second neighborhood image, a first point cloud model, and a second point cloud model. The first point cloud model is a three-dimensional point cloud model reconstructed in advance based on the first image set, and the second point cloud model is a three-dimensional point cloud model reconstructed in advance based on the second image set.

The merging module 503 is configured to merge the first point cloud model and the second point cloud model based on the merge parameter to acquire a target point cloud model.

In some possible implementations, the image extracting module 501 is specifically configured to input the first and second image sets into a pre-trained image retrieval model, and acquire the target image pair output by the image retrieval model and the at least one first and second neighborhood images corresponding to the target image pair.

In some possible implementations, the parameter calculating module 502 is specifically configured to: perform feature triangulation based on a second matching relationship and a camera position corresponding to the at least one first neighborhood image to acquire a third point cloud model, wherein the second matching relationship includes a pixel matching relationship between the first target image and the at least one first neighborhood image, and the third point cloud model and the first point cloud model are presented in a same coordinate system on a same scale; perform feature triangulation based on a third matching relationship and a camera position corresponding to the at least one second neighborhood image to acquire a fourth point cloud model, wherein the third matching relationship includes a pixel matching relationship between the second target image and the at least one second neighborhood image, and the fourth point cloud model and the second point cloud model are presented in a same coordinate system on a same scale; and acquire the merge parameter based on a fourth matching relationship between a point cloud in the third point cloud model and a point cloud in the fourth point cloud model.

In some possible implementations, the second matching relationship and the third matching relationship are both obtained based on a first matching relationship. The first matching relationship is a pixel matching relationship between the first target image and the second target image in the target image pair.

In some possible implementations, the parameter calculating module 502 is specifically configured to acquire the fourth matching relationship based on the first matching relationship, the second matching relationship, the third matching relationship, a fifth matching relationship, and a sixth matching relationship, wherein the fifth matching relationship is a matching relationship between a pixel in the at least one first neighborhood image and the point cloud in the third point cloud model, and the sixth matching relationship is a matching relationship between a pixel in the at least one second neighborhood image and the point cloud in the fourth point cloud model; and acquire the merge parameter based on positions of the point clouds involved in the fourth matching relationship in respective coordinate systems.

In some possible implementations, the parameter calculating module 502 is specifically configured to acquire, based on the fourth matching relationship and the positions of the point clouds involved in the fourth matching relationship in respective coordinate systems, the merge parameter by employing an iterative closest point algorithm based on random sample consensus.

In some possible implementations, the merging module 503 is further configured to merge, after merging the first point cloud model and the second point cloud model based on the merge parameter to acquire the target point cloud model, the fourth matching relationship into the target point cloud model.

In some possible implementations, the parameter calculating module 502 is specifically configured to acquire target pixels in the target image pair, the at least one first neighborhood image, and the at least one second neighborhood image respectively that are corresponding to a pre-labeled feature point in the target scene, and point clouds in the first point cloud model and the second point cloud model respectively that are corresponding to the pre-labeled feature point; and acquire the merge parameter based on the target pixels and the target point clouds corresponding to the feature points.

In some possible implementations, the parameter calculating module 502 is specifically configured to acquire, based on a position of each of the target pixels in the image to which the target pixel belongs and a position of each of the target point clouds in the point cloud model to which the target point cloud belongs, the merge parameter by employing a PnP algorithm based on random sample consensus.

In some possible implementations, the merging module 503 is further configured to merge, after merging the first point cloud model and the second point cloud model based on the merge parameter to acquire the target point cloud model, a correspondence relationship among the feature points, the target pixels and the target point clouds into the target point cloud model.

In some possible implementations, the merging module 503 is further configured to merge camera positions of the first images in the first image set and camera positions of the second images in the second image set into the target point cloud model based on the merge parameter.

In some possible implementations, the point cloud model processing apparatus 500 further includes: a point cloud model optimizing module 504. Herein, the point cloud model optimizing module 504 is configured to perform maximum likelihood estimation on the camera positions of the first images, new camera positions of the second images, and positions of the point clouds in the target point cloud model based on a bundle adjustment optimization algorithm to obtain an estimation result; and adjust the camera positions of the first images, the camera positions of the second images, and the positions of the point clouds in the target point cloud model based on the estimation result.

The point cloud model processing apparatus provided in the present embodiment can be used to implement the technical solution of any of the above-mentioned method embodiments. The implementation principles and technical effects of the embodiments are similar, and reference can be made to the description of the above-mentioned embodiments, which will not be repeated here.

Figure 6:
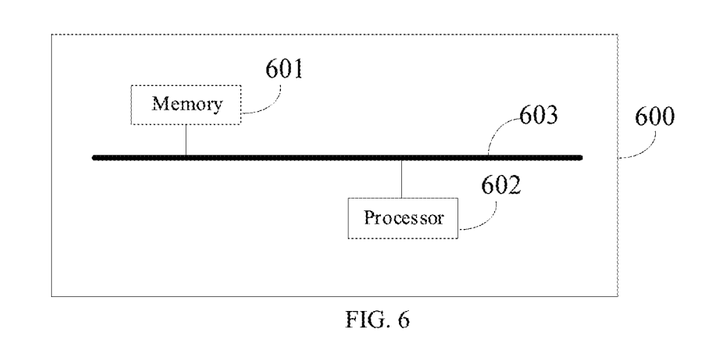
FIG. 6 is a schematic diagram showing a structure of an electronic device according to an embodiment of the present disclosure.

FIG. 6 is a block diagram of an electronic device according to an embodiment of the present disclosure. With reference to FIG. 6, the present embodiment provides an electronic device 600 including a memory 601 and a processor 602.

The memory 601 may be a separate physical unit that may be coupled to the processor 602 via a bus 603. The memory 601 and the processor 602 may also be integrated together, and implemented in hardware, etc.

The memory 601 is configured to store a program instruction that processor 602 calls to perform the operations of any of the above method embodiments.

Optionally, when a part or all of the method of the embodiments described above is implemented in software, the electronic device 600 may include only the processor 602. The memory 601 for storing a program is external to the electronic device 600, and the processor 602 is connected to the memory through a circuit/wire for reading and executing the program stored in the memory.

The processor 602 may be a central processing unit (CPU), a network processor (NP), or a combination of CPU and NP.

The processor 602 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 601 may include a volatile memory, such as random-access memory (RAM). The memory may include a non-volatile memory, such as a flash memory, a hard disk drive (HDD), or a solid-state drive (SSD). The memory may include a combination of such memories mentioned above.

The present disclosure also provides a computer-readable storage medium having embodied therein computer program instructions which, when executed by at least one processor of the electronic device, performs the technical solution of any of the above method embodiments.

The present disclosure also provides a program product including a computer program stored in a readable storage medium from which at least one processor of the electronic device can read the computer program, and the computer program is executable by the at least one processor to cause the electronic device to perform the technical solution of any of the above method embodiments.

It is noted that relational terms such as "first" and "second" may be used herein merely to distinguish one entity or action from another entity or action without necessarily requiring or implying any actual such relationship or order between such entities or actions. Furthermore, the terms like "comprise", "include", or any other variation thereof, are intended to indicate a non-exclusive inclusion, such that a process, method, article, or apparatus that includes a list of elements does not include only those elements but may include other elements not expressly listed or inherent to such process, method, article, or apparatus. An element proceeded by the phrase "comprising a . . . " does not, without more constraints, preclude the existence of additional identical elements in the process, method, article, or apparatus that includes the element.

The previous description of the disclosed embodiments is provided merely to enable any person skilled in the art to make or use the present disclosure. Various modifications to these embodiments will be readily apparent to those skilled in the art, and the generic principles defined herein may be implemented in other embodiments without departing from the spirit or scope of the disclosure. Thus, the present disclosure is not intended to be limited to the embodiments shown herein but is to comply with the widest scope consistent with the principles and novel features disclosed herein.

What is claimed is:

1. A point cloud model processing method, comprising:
acquiring, based on first and second image sets photographed for a target scene, a target image pair and at least one first and second neighborhood images corresponding to the target image pair, wherein the first image set comprises a plurality of first images having a first visual effect, the second image set comprises a plurality of second images having a second visual effect, the target image pair comprises a first target image and a second target image having a similarity satisfying a first criterion, the at least one first neighborhood image comprises an image in the first image set having a similarity with the first target image satisfying a second criterion, the at least one second neighborhood image comprises an image in the second image set having a similarity with the second target image satisfying a third criterion;

acquiring a merge parameter based on a relationship among the target image pair, the at least one first neighborhood image, the at least one second neighborhood image, a first point cloud model, and a second point cloud model, wherein the first point cloud model comprises a three-dimensional point cloud model reconstructed in advance based on the first image set, the second point cloud model comprises a three-dimensional point cloud model reconstructed in advance based on the second image set; and merging the first point cloud model and the second point cloud model based on the merge parameter to acquire a target point cloud model.

2. The method according to claim 1, wherein said acquiring, based on the first and second image sets photographed for the target scene, the target image pair and the at least one first and second neighborhood images corresponding to the target image pair comprises:

inputting the first and second image sets into a pre-trained image retrieval model, and acquiring the target image pair output by the image retrieval model and the at least one first and second neighborhood images corresponding to the target image pair.

3. The method according to claim 1, wherein said acquiring the merge parameter based on the relationship among the target image pair, the at least one first neighborhood image, the at least one second neighborhood image, the first point cloud model, and the second point cloud model comprises:

performing feature triangulation based on a second matching relationship and a camera position corresponding to the at least one first neighborhood image to acquire a third point cloud model, wherein the second matching relationship comprises a pixel matching relationship between the first target image and the at least one first neighborhood image, and the third point cloud model and the first point cloud model are presented in a same coordinate system on a same scale;

performing feature triangulation based on a third matching relationship and a camera position corresponding to the at least one second neighborhood image to acquire a fourth point cloud model, wherein the third matching relationship comprises a pixel matching relationship between the second target image and the at least one second neighborhood image, and the fourth point cloud model and the second point cloud model are presented in a same coordinate system on a same scale; and acquiring the merge parameter based on a fourth matching relationship between a point cloud in the third point cloud model and a point cloud in the fourth point cloud model.

4. The method according to claim 3, wherein the second matching relationship and the third matching relationship are both obtained based on a first matching relationship, wherein the first matching relationship is a pixel matching relationship between the first target image and the second target image in the target image pair.

5. The method according to claim 4, wherein said acquiring the merge parameter based on a point cloud matching relationship between the point cloud in the third point cloud model and the point cloud in the fourth point cloud model comprises:

acquiring the fourth matching relationship based on the first matching relationship, the second matching relationship, the third matching relationship, a fifth matching relationship, and a sixth matching relationship, wherein the fifth matching relationship is a matching relationship between a pixel in the at least one first neighborhood image and the point cloud in the third point cloud model, and the sixth matching relationship is a matching relationship between a pixel in the at least one second neighborhood image and the point cloud in the fourth point cloud model; and acquiring the merge parameter based on positions of point clouds involved in the fourth matching relationship in respective coordinate systems.

6. The method according to claim 3, wherein said acquiring the merge parameter based on the fourth matching relationship between the point cloud in the third point cloud model and the point cloud in the fourth point cloud model comprises:

acquiring, based on the fourth matching relationship and the positions of point clouds involved in the fourth matching relationship in respective coordinate systems, the merge parameter by employing an iterative closest point algorithm based on random sample consensus.

7. The method according to claim 3, wherein the method further comprises: after said merging the first point cloud model and the second point cloud model based on the merge parameter to acquire the target point cloud model, merging the fourth matching relationship into the target point cloud model.

8. The method according to claim 1, wherein said acquiring the merge parameter based on the relationship among the target image pair, the at least one first neighborhood image, the at least one second neighborhood image, the first point cloud model, and the second point cloud model comprises:

acquiring target pixels in the target image pair, the at least one first neighborhood image, and the at least one second neighborhood image respectively that are corresponding to a pre-labeled feature point in the target scene, and point clouds in the first point cloud model and the second point cloud model respectively that are corresponding to the pre-labeled feature point; and acquiring the merge parameter based on the target pixels and the target point clouds corresponding to the feature points.

9. The method according to claim 8, wherein said acquiring the merge parameter based on the target pixels and the target point clouds corresponding to the feature points comprises:

acquiring, based on a position of each of the target pixels in the image to which the target pixel belongs and a position of each of the target point clouds in the point cloud model to which the target point cloud belongs, the merge parameter by employing a PnP algorithm based on random sample consensus.

10. The method according to claim 8, wherein the method further comprises: after said merging the first point cloud model and the second point cloud model based on the merge parameter to acquire the target point cloud model, merging a correspondence relationship among the feature points, the target pixels and the target point clouds into the target point cloud model.

11. The method according to claim 1, further comprising:

merging camera positions of the first images in the first image set and camera positions of the second images in the second image set into the target point cloud model based on the merge parameter.

12. The method according to claim 11, further comprising:

performing maximum likelihood estimation on the camera positions of the first images, new camera positions of the second images, and positions of the point clouds in the target point cloud model based on a bundle adjustment optimization algorithm to obtain an estimation result; and adjusting the camera positions of the first images, the camera positions of the second images, and the positions of the point clouds in the target point cloud model based on the estimation result.

13. The method according to claim 1, further comprising: reconstructing a three-dimensional structure of the target scene based on the target point cloud model.

14. A non-transitory computer readable storage medium, comprising a program, wherein
when the program is executed by at least one processor of an electronic device, the electronic device implements the point cloud model processing method according to claim 1.

15. An electronic device, comprising a memory, a processor, and a computer program instruction, wherein
the memory is configured to store the computer program instruction; and
the processor is configured to execute the computer program instruction, and the processor, when executing the computer program instruction, implements steps of:
acquiring, based on first and second image sets photographed for a target scene, a target image pair and at least one first and second neighborhood images corresponding to the target image pair, wherein the first image set comprises a plurality of first images having a first visual effect, the second image set comprises a plurality of second images having a second visual effect, the target image pair comprises a first target image and a second target image having a similarity satisfying a first criterion, the at least one first neighborhood image comprises an image in the first image set having a similarity with the first target image satisfying a second criterion, the at least one second neighborhood image comprises an image in the second image set having a similarity with the second target image satisfying a third criterion;
acquiring a merge parameter based on a relationship among the target image pair, the at least one first neighborhood image, the at least one second neighborhood image, a first point cloud model, and a second point cloud model, wherein the first point cloud model comprises a three-dimensional point cloud model reconstructed in advance based on the first image set, the second point cloud model comprises a three-dimensional point cloud model reconstructed in advance based on the second image set; and
merging the first point cloud model and the second point cloud model based on the merge parameter to acquire a target point cloud model.

16. The electronic device according to claim 15, wherein said acquiring, based on the first and second image sets photographed for the target scene, the target image pair and the at least one first and second neighborhood images corresponding to the target image pair comprises:
inputting the first and second image sets into a pre-trained image retrieval model, and acquiring the target image pair output by the image retrieval model and the at least one first and second neighborhood images corresponding to the target image pair.

17. The electronic device according to claim 16, wherein the second matching relationship and the third matching relationship are both obtained based on a first matching relationship, wherein the first matching relationship is a pixel matching relationship between the first target image and the second target image in the target image pair.

18. The electronic device according to claim 15, wherein said acquiring the merge parameter based on the relationship among the target image pair, the at least one first neighborhood image, the at least one second neighborhood image, the first point cloud model, and the second point cloud model comprises:
performing feature triangulation based on a second matching relationship and a camera position corresponding to the at least one first neighborhood image to acquire a third point cloud model, wherein the second matching relationship comprises a pixel matching relationship between the first target image and the at least one first neighborhood image, and the third point cloud model and the first point cloud model are presented in a same coordinate system on a same scale;
performing feature triangulation based on a third matching relationship and a camera position corresponding to the at least one second neighborhood image to acquire a fourth point cloud model, wherein the third matching relationship comprises a pixel matching relationship between the second target image and the at least one second neighborhood image, and the fourth point cloud model and the second point cloud model are presented in a same coordinate system on a same scale; and
acquiring the merge parameter based on a fourth matching relationship between a point cloud in the third point cloud model and a point cloud in the fourth point cloud model.

19. The electronic device according to claim 18, said acquiring the merge parameter based on a point cloud matching relationship between the point cloud in the third point cloud model and the point cloud in the fourth point cloud model comprises:
acquiring the fourth matching relationship based on the first matching relationship, the second matching relationship, the third matching relationship, a fifth matching relationship, and a sixth matching relationship, wherein the fifth matching relationship is a matching relationship between a pixel in the at least one first neighborhood image and the point cloud in the third point cloud model, and the sixth matching relationship is a matching relationship between a pixel in the at least one second neighborhood image and the point cloud in the fourth point cloud model; and
acquiring the merge parameter based on positions of point clouds involved in the fourth matching relationship in respective coordinate systems.

20. The electronic device according to claim 18, wherein said acquiring the merge parameter based on the fourth matching relationship between the point cloud in the third point cloud model and the point cloud in the fourth point cloud model comprises:
acquiring, based on the fourth matching relationship and the positions of point clouds involved in the fourth matching relationship in respective coordinate systems, the merge parameter by employing an iterative closest point algorithm based on random sample consensus.

* * * * *